United States Patent [19]

Beckey et al.

[11] Patent Number: 4,750,672
[45] Date of Patent: Jun. 14, 1988

[54] MINIMIZING OFF CYCLE LOSSES OF A REFRIGERATION SYSTEM IN A HEATING MODE

[75] Inventors: Thomas J. Beckey, Edina; Lorne W. Nelson, Bloomington, both of Minn.

[73] Assignee: Honeywell Inc., Minneapolis, Minn.

[21] Appl. No.: 50,270

[22] Filed: May 15, 1987

[51] Int. Cl.⁴ ............................................. G05D 23/00
[52] U.S. Cl. ...................................... 237/2 B; 62/180; 62/231
[58] Field of Search ................. 62/180, 179, 190, 115, 62/498, 231; 237/2 B

[56] References Cited

U.S. PATENT DOCUMENTS

| 3,677,020 | 7/1972 | Raymond | 62/200 |
| 4,075,865 | 2/1978 | Wills | 62/183 |
| 4,136,730 | 1/1979 | Kinsey | 165/12 |
| 4,267,702 | 5/1981 | Houk | 62/115 |
| 4,346,567 | 8/1982 | Snieder | 62/160 |

FOREIGN PATENT DOCUMENTS

| 0077414 | 4/1983 | European Pat. Off. | 62/190 |
| 0113937 | 9/1981 | Japan | 62/180 |

Primary Examiner—William E. Wayner
Attorney, Agent, or Firm—Mitchell J. Halista; Albin Medved

[57] ABSTRACT

A refrigeration system control method for minimizing off cycle losses in a heating mode of operation includes the steps of closing a valve in a refrigerant line between an indoor coil and an outdoor coil for a first predetermined period of time starting with a deenergization of a compressor and ending before a reenergization of the compressor to retain the refrigerant in the indoor coil and maintaining an energization of an indoor coil fan for a second predetermined time period after the deenergization of the compressor which second time ends before the first time period. An apparatus using this method includes an indoor condensor coil, an indoor coil fan, an outdoor evaporator coil, an outdoor coil fan, a refrigerant line connecting one end of the outdoor coil to one end of the indoor coil, a valve in the refrigerant line, a compressor means connecting the other end of the indoor coil to the other end of the outdoor coil and a timer for operating the valve, the indoor fan, the outdoor fan and the compressor in a predetermined sequence to produce a closed state of the valve for a first time period starting after a compressor operation and ending before a restoration of a compressor operation while maintaining an energization of the indoor fan for a second time period after a compressor operation and ending before the first time period to utilize the latent energy stored in the refrigerant and in the metal coil of the indoor coil.

2 Claims, 1 Drawing Sheet

MINIMIZING OFF CYCLE LOSSES OF A REFRIGERATION SYSTEM IN A HEATING MODE

BACKGROUND OF THE INVENTION

Field of the Invention

The present invention relates to a refrigeration system. More specifically, the present invention is directed to a control method for a refrigeration system for minimizing off cycle losses and an apparatus using the method.

SUMMARY OF THE INVENTION

An object of the present invention is to provide an improved refrigeration system control method to minimize off cycle losses. Another object of the present invention is to provide an improved refrigeration system utilzing the improved control method.

In accomplishing this and other objects, there has been provided, in accordance with the present invention a method for in a heating mode of operation controlling a refrigeration system having an indoor condenser coil, an indoor coil fan, an outdoor evaporator coil, and outdoor coil fan, a refrigerant line between one end of the indoor coil and one end of the outdoor coil, a valve in the refrigerant line and a compressor means connecting the other end of the indoor coil to the other end of the outdoor coil including the steps of closing the valve for a first predetermined time period starting with a deenergization of the compressor means and ending before reenergization of the compressor means and maintaining an energization of the indoor fan for a second predetermined time period after the deenergization of the compressor means operating in a heating mode. An apparatus utilizing this method in a refrigeration system operating in a heating mode comprises an indoor coil, an indoor coil fan, an outdoor evaporator condenser coil, an outdoor coil fan, a refrigerant line connecting one end of the indoor coil to one end of the outdoor coil, a valve in the refrigerant line, a compressor means connecting the other end of the indoor coil to the other end of the outdoor coil and a timer means for operating the valve, the indoor fan, the outdoor fan and the compressor in a predetermined sequence to produce a closed state of the valve for a first time period starting after a compressor operation and ending before a restoration of compressor operation while maintaining an energization of the indoor fan for a second time period after a compressor operation and ending before the first time period to capture the latent energy stored in the refrigerant and in the metal coil of indoor coil.

BRIEF DESCRIPTION OF THE DRAWING

A better understanding of the present invention may be had when the following detailed description is read in connection with the accompanying drawings in which.

DESCRIPTION OF THE PREFERRED EMBODIMENT

Figure 1:
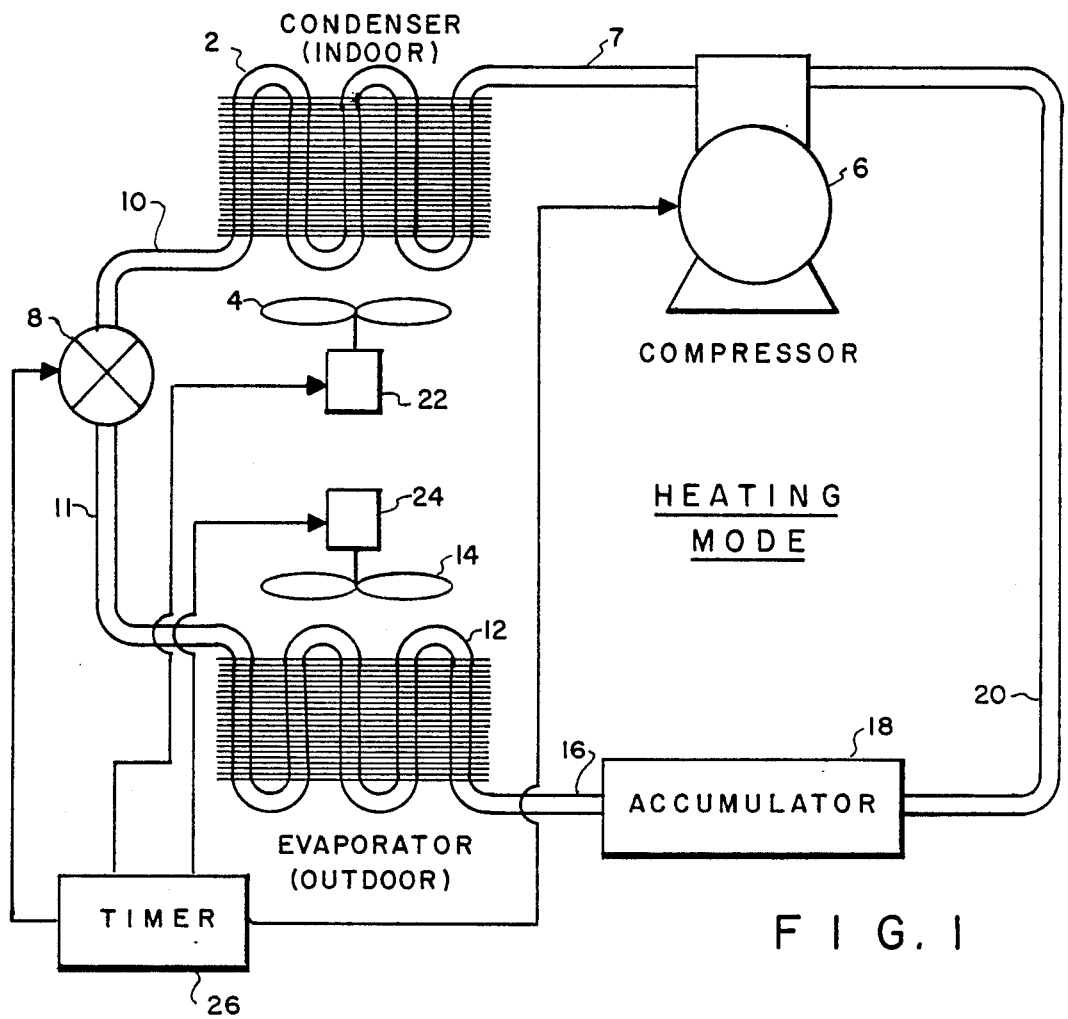
FIG. 1 is a simplified pictorial illustration of a refrigeration system embodying an example of the present invention in a heating mode and FIG. 2 is a timing diagram illustrating the operation of the refrigeration system shown in FIG. 1.

Referring to FIG. 1 in more detail, there is shown a simplified pictorial illustration of a refrigeration system arranged in a heating mode having an indoor coil identified as a condenser coil 2 and an indoor coil fan 4. These elements are conventionally referred to as indoor elements inasmuch as they are located within the enclosure to be heated by the flow of indoor air over the condenser 2 during a heating mode of operation. In a cooling mode of operation, the flow of refrigerant is reversed and the indoor coil unit is used as an evaporator coil to cool the flow of air within the enclosure. The outdoor coil would concurrently function as a condenser coil. The present invention is applicable to both types of operation to recover the latent energy stored in the indoor coil. An apparatus utilizing both types of operation with a reversing valve to selectively switch from one mode of operation to the other is designated as a heat pump. A compressor 6 is used to supply compressed refrigerant along a first refrigerant line 7 to an inlet of the condenseor 2. An electrically operated valve 8 in a second refrigerant line 10 connected to the outlet of the condenser 2 is used to control the flow of refrigerant from the condenser 2. The outlet from the valve 8 is connected through a third line 11 to an inlet of an outdoor coil 12 having a fan 14 associated therewith. Since these elements are arranged externally of the enclosure to be heated during the heating mode of operation they are referred to as outdoor elements.

Figure 2:
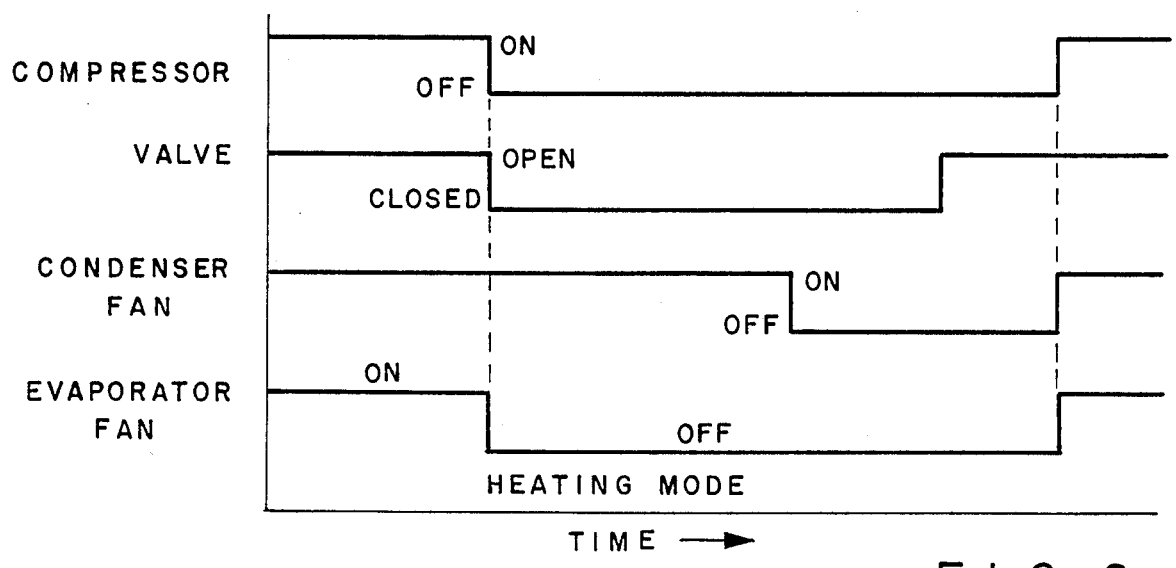

The output from the evaporator 12 is connected through a fourth line 16 to an input of a refrigerant accumulator 18. An output from the accumulator 18 is connected through a fifth line 20 to the inlet of the compressor 6. A motor 22 for the condenser fan 4, a motor 24 for the evaporator fan 14, the valve 8 and the compressor 6 are operated in a predetermined sequential pattern as illustrated in FIG. 2 by a timer 26. While such multiple time sequence timers are well-known in the art, the timing sequence illustrated in FIG. 2 to achieve the novel method of the present invention can also be obtained from a microprocessor operated according to a fixed program stored in a memory. The operation of a microprocessor and the storage of a program to operate a microprocessor are well-known operations to one skilled in the art and require no further explanation for a complete understanding of the present invention.

During steady state operation in the heating mode, most of the system's refrigerant resides in the condenser 2 and line 10 as a hot liquid. If the refrigerant valve is not shut tightly when the compressor is turned off, the refrigerant will migrate from the condenser and line 10 to the evaporator. The heat energy in the refrigerant is, consequently, lost to the outdoor air by means of the evaporator coil. Also, the energy stored in the mass of the hot condenser coil may be lost if the condenser coil is located in an unconditioned space. Further, because the excess refrigerant in the evaporator has to be pumped back into the condenser when the compressor starts, the time to reach steady state is increased. Both of these effects result in a degradation of the cyclic coefficient of performance (COP) of the system.

In order to minimize such losses, the present invention is arranged to close the valve 8 immediately after the compressor 6 is turned off in order to contain the hot liquid refrigerant in the condenser or indoor coil 2 and line 10. Concurrently, the indoor fan 4 is allowed to continue running for a predetermined first period of time as determined by the timer 26 to capture the heat energy stored in the hot coil and refrigerant of the condenser. At the end of the first time period, the fan for the condenser 2 is turned off. After a second time period which is prior to the next turn-on of the compressor, the valve 8 is opened, and the refrigerant is allowed to equalize pressures in the condensor 2 and the outdoor coil 12 for a specified time. Thus, the present system recovers the heat energy of the hot coil and refrigerant into the interior space being heated and equalizes the refrigerant pressure before starting the compressor to eliminate the need for a so-called "hard start kit". It should be noted that as previously stated the timing function provided by the timer 26 may be effected by a suitable program in a microprocessor which is used to control the refrigeration system. Also, as previously stated, the present invention is applicable to a cooling mode of operation in which the indoor coil functions as an evaporator to cool the indoor air and it is desired to enhance the cooling function by continuing the operation of the indoor fan after the compressor is turned off and the valve 8 is closed. In the cooling mode, the designations of evaporator and condenser used in the timing diagram of FIG. 2 would be reversed.

Accordingly, it may be seen that there has been provided, in accordance with the present invention, a method for controlling a refrigeration system for reducing off cycle losses and a refrigeration system using this method.

The embodiments of the present invention in which an exclusive property or privilege is claimed are defined as follows:

1. A method for controlling in a heating mode of operation a refrigeration system having an indoor condenser coil, an indoor coil fan, an outdoor evaporator coil, an outdoor coil fan, a refrigerant line between one end of the indoor coil and one end of the outdoor coil, a valve in the refrigerant line and a compressor means connecting the other end of the indoor coil to the other end of the outdoor coil including the steps of closing the valve for a first predetermined time period starting with a deenergization of the compressor means and ending before a reenergization of the compressor means and maintaining an energization of the indoor coil fan for a second predetermined time period after the deenergization of the compressor means which second time period ends before said first time period.

2. A refrigeration system operating in a heating mode comprising
   an indoor condenser coil,
   an indoor coil fan,
   an outdoor evaporator coil,
   an outdoor coil fan,
   a refrigerant line connecting one end of said indoor coil to one end of said outdoor coil,
   a valve in said refrigerant line,
   compressor means connecting the other end of said indoor coil to the other end of said outdoor coil and
   a timer means for operating the valve, the indoor fan, the outdoor fan and the compressor in a predetermined sequence in a heating mode of operation for producing a closed state of the valve for a first time period starting with a deenergization of said compressor means and ending before a reenergization of said compressor means while maintaining an energization of said indoor fan for a second time period after a compressor operation and ending before said first time period to capture the latent energy stored in the refrigerant and in the metal in said indoor coil.

* * * * *